United States Patent [19]

Stewart

[11] 3,977,099

[45] Aug. 31, 1976

[54] NURSERY STOCKS DIGGING MACHINE

[75] Inventor: John E. Stewart, Gresham, Oreg.

[73] Assignee: Nursery Implements, Inc., Gresham, Oreg.

[22] Filed: Dec. 16, 1974

[21] Appl. No.: 532,835

[52] U.S. Cl. ................................. 37/2 R
[51] Int. Cl.² .............................. A01G 23/04
[58] Field of Search ............... 37/2 R; 144/2 N

[56] References Cited
UNITED STATES PATENTS

| | | | |
|---|---|---|---|
| 2,549,476 | 4/1951 | Johnson | 37/2 R X |
| 2,990,630 | 7/1961 | Granford | 37/2 R |
| 3,045,368 | 7/1962 | Whitcomb | 37/2 R |
| 3,078,602 | 2/1963 | Holopainen | 37/2 R |
| 3,163,944 | 1/1965 | Whitcomb | 37/2 R |
| 3,713,234 | 1/1973 | Grover et al. | 37/2 R |
| 3,739,823 | 6/1973 | Bartell | 37/2 R X |

*Primary Examiner*—Stephen C. Pellegrino
*Attorney, Agent, or Firm*—Klarquist, Sparkman, Campbell, Leigh, Hall & Whinston

[57] ABSTRACT

The digging machine according to the present invention includes pairs of spherical blades which are rotated beneath a plant for forming a root ball and removing the plant. By operation of a pair of parallelogram linkages, the spherical blades are rotated beneath the surface of the ground, and spherical blade covers are moved downwardly to encompass the upper part of a root ball for convenient removal thereof.

11 Claims, 7 Drawing Figures

U.S. Patent   Aug. 31, 1976   Sheet 2 of 2   3,977,099
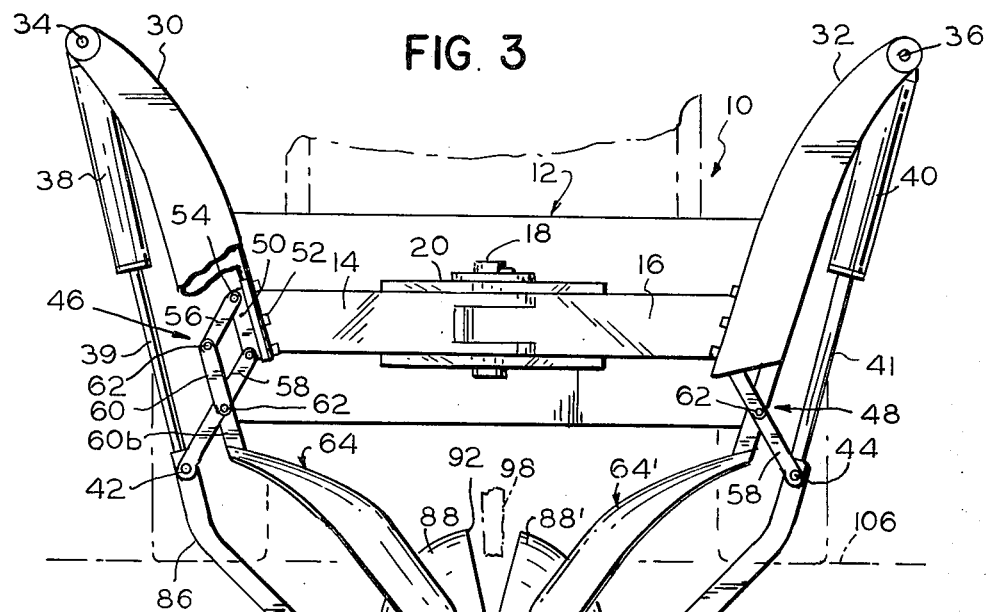
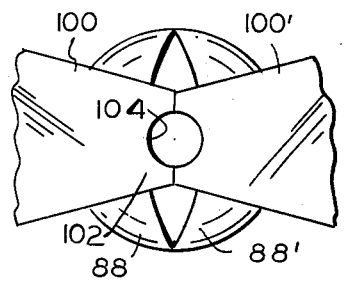
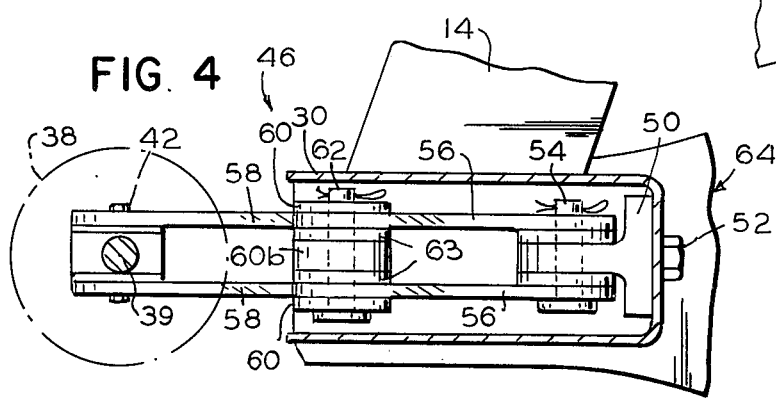
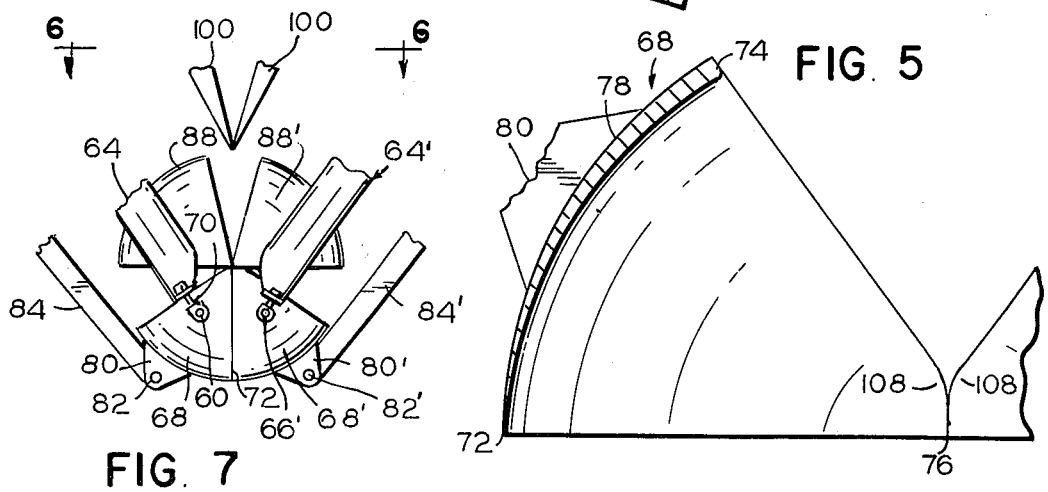

NURSERY STOCKS DIGGING MACHINE

BACKGROUND OF THE INVENTION

The present invention relates to nursery digging machines and in particular to a machine for conveniently digging and forming a root ball beneath a plant or tree for removal of the same from the ground.

In the removal of a plant or tree from a nursery for shipping and replanting at a remote location, a ball of earth and plant roots are excavated and wrapped so that the plant may withstand removal and transplanting. In most cases the formation of the root ball has been manually accomplished in order to obtain the optimum shaping of the root ball and care of the plant, especially in cases where the plant must be removed in rather close quarters from a row of plants.

Various apparatus has alternatively been employed for digging up plants and trees, but has generally included diagonally driven blades which form a V-shaped wedge of earth for removal rather than a more or less spherical root ball. The operation of machinery of this type frequently requires an angular disposition of the digging mechanism such that an inordinate amount of space is required and sometimes the apparatus cannot be employed in removing plants or trees disposed close to one another in a row. Other apparatus has been proposed for forming a semi-spherical root ball underneath the surface of the ground, i.e. commencing with a flat surface area with a hemisphere of earth being removed below the plant. This arrangement does not optimize the desired shaping of the root ball relative to the least amount of weight to be transported, and may also require a relatively large cut.

SUMMARY OF THE INVENTION

According to the present invention, a pair of blades are supported from pairs of parellelogram linkages which are in turn supported from first and second pivotable support means adapted for movement toward and away from one another in a substantially horizontal direction. Initially, the blades are suitably formed downwardly into the surface of the ground whereby a top portion of a root ball is formed. The operation of the parallelogram linkages facilitates the rotation of the blades beneath the surface of the ground to form the bottom of a root ball.

The parallelogram linkages also desirably carry a pair of blade covers which can encompass the top of the root ball as the blades rotate downwardly. The blades, and also the blade covers, desirably have compound curved shapes in the form of segments of spheres. Also, the blades are preferably tapered in wall thickness to a narrow forward cutting edge which, together with the spherical shape, enhances the cutting ease as well as the formation of the spherical root ball.

It is accordingly an object of the present invention to provide an improved nursery stocks digging machine for forming substantially spherical root balls.

It is a further object of the present invention to provide an improved nursery stocks digging machine which combines ease of operation with the formation of an advantageously shaped root ball.

It is a further object of the present invention to provide an improved nursery stocks digging machine which enhances the removal and transplanting of trees or plants from one location to another.

It is a further object of the present invention to provide an improved nursery stocks digging machine which consumes minimized space along a row of plants.

The subject matter which I regard as my invention is particularly pointed out and distinctly claimed in the concluding portion of this specification. The invention, however, both as to organization and method of operation, together with further advantages annd objects thereof, may best be understood by reference in the following description taken in connection with the accompanying drawings wherein like reference characters refer to like elements.

DRAWINGS

FIG. 3 is a forward elevational view showing the nursery stocks digging machine according to the present invention in a second stage of digging operation;

FIG. 4 is a cross sectional view taken at 4—4 in FIG. 1 further illustrating a parallelogram linkage employed according to the present invention;

FIG. 5 is a cross sectional view of blade construction according to the present invention;

FIG. 6 is a partially broken away plan view further illustrating a branch shield which may be employed according to the present invention; and FIG. 7 is a partially broken away elevational view further illustrating the location of such branch shield.

DETAILED DESCRIPTION

Figure 1:
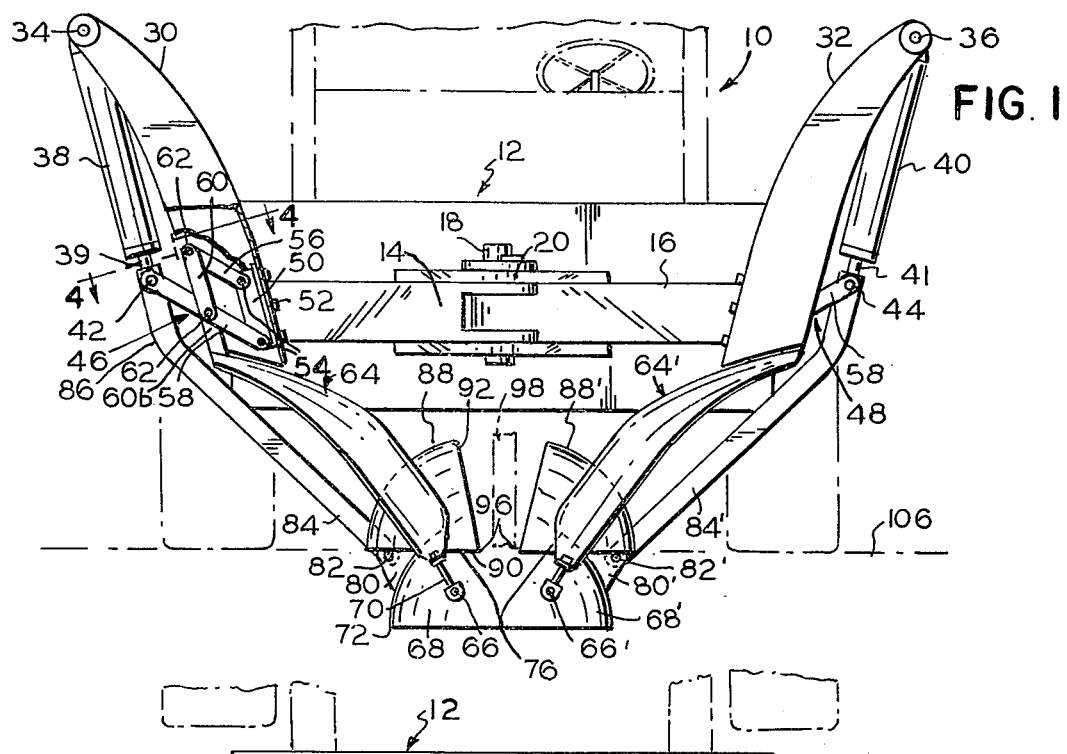
FIG. 1 is a forward elevational view of a nursery stocks digging machine according to the present invention, the machine being shown in a first stage of digging operation.
Figure 2:
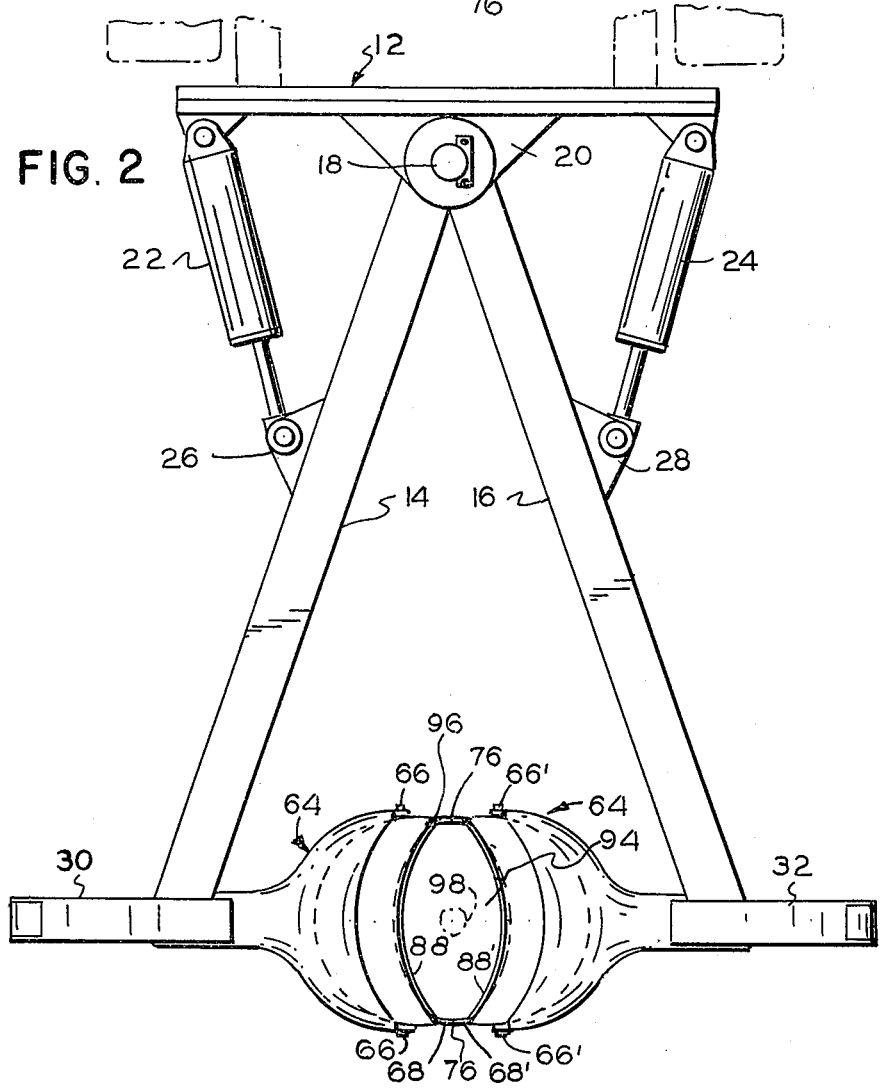
FIG. 2 is a plan view of the FIG. 1 machine.

Referring to the drawings and particularly in FIGS. 1 and 2, a nursery stock digging machine according to the present invention includes first and second pivotable support means for mounting on a vehicle such as a backbone, tractor, lift truck or loader. In FIGS. 1 and 2 the apparatus is mounted upon a New Holland loader 10 having an equipment adapter generally indicated at 12 to which the nursery stocks digging machine according to the present invention is attached. The first and second pivotable support means comprise beams 14 and 16 extending horizontally into vertical shaft 18 about which they rotate, shaft 18 being supported from equipment adapter 12 by means of brackets 20. Hydraulic cylinders 22 and 24 are interposed between equipment adapter 12 and brackets 26 and 28 respectively attached to beams 14 and 16, for the purpose of rotating beams 14 and 16 toward and away from one another.

The pivotable support means further comprise substantially upright, U-shaped frame members 30 and 32 secured to the outward ends of beams 14 and 16 respectively. The upright members 30 and 32 are preferably disposed at an angle to the arms such that members 30 and 32 extend upwardly and outwardly from one another, while being outwardly curved near their upper extremities where pivots 34 and 36 are located for supporting hydraulic cylinders 38 and 40 respectively. The upper portions of these cylinder bodies are received into the open sides of U-shaped frame members 30 and 32, with the cylinders extending downwardly in approximately parallel relation to members 30 and 32 for attachment of rods 39 and 41 to pivots 42 and 44 of parallelogram linkages 46 and 48 partly housed within the members 30 and 32.

Parallelogram linkage 46 will be considered in greater detail and is also illustrated in cross section in FIG. 4. It is understood linkage 48 has substantially the same construction and operation but is oriented in the opposite direction. A bracket 50 is secured to the end wall of U-shaped member 30 by means of screws 52, and receives pins 54 by means of which upper and lower parallelogram arms 56 and 58 are secured for rotation with respect to bracket 50. Arm 58 extends outwardly to pivot 42, as a lever arm, such that operation of cylinder 38 rotates arm 58 as well as arm 56 via the interposition of an arm 60 pivotally engaged between arms 56 and 58 with pivotal connections 62.

As will be noted, each of the various parallelogram linkage arms comprises a pair of members duplicated on opposite sides of bracket 50 for purposes of stability. Moreover, arm 60, which is maintained in substantially parallel relation to bracket 50 by operation of the linkage, further includes a central member 60b, inside arms 56 and 58 and separated therefrom by means of washers 42. Member 60b comprises an upper extension of a generally downwardly disposed first arm 64 which flares laterally outwardly as well as toward its opposite member 64'. Arm 64 is bifurcated at its lower end and provided with a pair of side pivots 66 between which a blade 68 is held. Pivots 66 are adjustable relative to the said first arm 64 employing threadably adjustable studs 70.

Blade 68 desirably comprises a compound curved shape in the form of a segment of a sphere including a circumferential forward edge 72 and a circumferential rearward edge as more fully illustrated in FIG. 5. The forward edge 72 and the rearward edge 74 meet at side points 76 which are disposed near the general location of ends of a diameter of the spherical contour. In other words, the shape 78 between forward edge 72 and rearward edge 74 may be considered as the outer surface of the sphere having an approximate radius of curvature centered midway along a spherical diameter between points 76. Employing the spherical shape, a root ball of a plant is most efficaciously and easily formed in the manner hereinafter more fully described. Furthermore, it is preferred that the forward edge 72 be relatively sharp or narrow, while the surface 78 tapers to a larger thickness at rearward edge 74 whereby the strength of the blade is enhanced. The blade edge comprising a segment of a sphere can be cast and machined, or machined entirely from a segment of thick walled cylindrical pipe, having the exterior and interior of the wall thereof machined to the spherical shape.

It will be noted that pivots 66 are spaced rearwardly of points 76 and toward a bracket 80 secured to the rearward side of surface 78 midway between the pivot points. Said bracket provides a pivotal connection 82 with a second arm 84 which is also connected to pivot 42 and extends generally downwardly therefrom toward blade 68, arm 84 changing somewhat in angular direction at 86 for passing around the parallelogram linkage structure and the upper portion of arm 64. The distances between points 76, pivots 66 and connection 82 correspond to the distance between pins 54, pins 62 and pivot 42 of the parallelogram linkage so that as the parallelogram linkage is rotated, the blade 68 rotates about points 76 for digging into the ground as hereinafter more fully described.

A blade cover 88 is secured to the bifurcated end of arm 64 above the location of pivot points 66. This blade cover desirably has the shape of a segment of a sphere which is similar to, but which may be slightly larger in area of surface than, blade 68. It is secured to arm 64 so that it has a lower circumferential edge 90 which is suitably horizontal and an upper circumferential edge 92 which makes an angle of less than 90° with edge 90. In this manner, when the machine operates as hereinafter more fully described, an area of separation 94 will remain even with points 76 of blades 68 and 68' drawn together, so that the trunk 98 of a tree or plant will be able to pass upwardly between blade covers 88 and 88'. The purpose of the blade covers is the replacement of blades 68 and 68' relative to the top of the root ball as the blades 68 and 68' rotate downwardly in operation of the machine. Consequently, blade covers 88 and 88' will hold and secure the top of the root ball for removal of the plant together with the earth comprising the root ball. The blade cover has substantially the same spherical radius as the blade, and may be manufactured in the same way except it is desirably manufactured to have uniform thickness.

As further illustrated in FIGS. 6 and 7, the apparatus according to the present invention may be further provided with a branch shield 100 which can be secured to member 30 (by means not shown). The branch shield extends angularly inwardly toward the location of the top of the root ball, i.e. to the area of separation 94 between the blade covers, the shield having a foot portion 102 provided with a semi-aperture 104 for surrounding the trunk of the plant, and further bearing against the top of the root ball during operation of the machine. The shield not only helps to secure the root ball, but shields the apparatus from low lying branches of the plant or tree for preventing such branches from being caught in any part of the mechanism. It is understood the shield devices are preferred but not necessary to the operation of the machine.

It is understood that the mechanism described for the left hand side of the nursery stocks digging machine according to the present invention is substantially duplicated on the right hand side. Therefore, a detailed description of the right hand side of the machine will not be given. The right hand side of the apparatus employs a first downwardly extending arm 64' for supporting a blade cover 88' and for pivotally supporting a blade 68'. Furthermore, second arm 84' connects to a pivot 82' located on a bracket 80' at the rear of blade 68' for pivoting blade 68' about pivot points 68'.

In operation of the machine, the beams 14 and 16 will first be more widely separated than illustrated in FIG. 1 for the purpose of encompassing the trunk 98 of a plant or tree. Then the loader 10 is moved forwardly until blades 68, 68' are in line with the plant and cylinders 22 and 24 are then operated for bringing the blades 68, 68' together. The blades are brought together whereby side points 76 of each blade are touching or nearly touching. At this time, the forward edge 72 of each blade 68, 68' is not necessarily horizontal as depicted in FIG. 5, but rather linkage arm 58 is suitably approximately horizontal whereby forward edges 72 are disposed at somewhat of an angle to the surface of the ground. Then, the arms 14, 16 are forced downwardly through downward movement of the equipment adapter 12 of the loader whereby blades 68, 68' dig into the ground around the plant. As the equipment adapter is forced downwardly, the blades 68, 68' will "roll back", as digging commences, until the orientation illustrated in FIG. 1 is achieved, i.e. with the forward edge 72 substantially horizontal by the time the blades reach the position below the surface 106 of the ground as illustrated in FIG. 1. As will be noted, the blades 68, 68' at this time will have approximately formed the top portion of a round or spherical root ball. With the equipment adapter maintaining the apparatus at this level, cylinders 38 and 40 are operated whereby the forward edges 72 of blades 68, 68' are rotated together, i.e. to the position thereof shown in FIG. 3. It will be noted that the points 76 remain more or less stationary since they correspond to the fixed points of the parallelogram linkage, i.e. pins 54, and therefore a spherical root ball is formed. While the blades 68, 68' rotate together, the blade covers 88, 88' moves downwardly as arms 64, 64' move downwardly so that the blade covers take the place of the blades 68, 68' and hold the root ball together. As the blade covers 88, 88' move downwardly, forward points 96 of each blade move together and approximately meet the points 76 of the blade. It will be noted the blades 68, 68' are somewhat rounded in outline at locations 108, 108' (see FIG. 5) which is found to facilitate the combined section. At the same time, if branch shields 100, 100' are used, the feet 102 thereof will rest against the top of the root ball for further holding the same.

The compound curved, spherical shape of the blades facilitates the ease of cutting through the roots and forming the root ball as the blades rotate, and the sharply tapered forward edge thereof easily cuts under the plant. The parallelogram linkage provides underground rotation about points 76, and the downward movement of blade covers 88, 88' into the position theretofore taken by the blades. After the root ball is encompassed as illustrated in FIG. 3, the loader is operated to move the entire apparatus upwardly on the equipment adapter whereby the plant is conveyed to a location for wrapping the root ball.

Not only is the present apparatus found efficacious in forming a spherical root ball, but it is also easily maneuverable toward a row of plants without consuming an inordinate amount of space along the line of a row of plants. In other words, a single plant or tree can be removed without interference with plants or trees on either side thereof.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. A nursery stocks digging machine comprising:
first and second support means for mounting upon a vehicle, and means for causing relative movement of said support means toward one another,
a parallelogram linkage pivotally connected to each support means and including control means for pivoting said parallelogram linkage with respect to each support means,
a first arm carried by said parallelogram linkage for movement constrained by said linkage to a direction parallel to components of said linkage,
a blade pivotally suspended from each first arm, each said blade having a rounded configuration between first and second pivot points of said first arm and curving downwardly in a downward position of said blade adapting said blade in said downward position to encompass a body of earth around a portion of the roots of a plant,
and a second arm connected to each said parallelogram linkage at a point of greater movement thereof than the movement imparted to said first arm, said second arm being connected to said blade at a third point thereon spaced from the first and second pivot points of said first arm wherein movement of said second arm rotates said blade about said pivot points when said first and second arms move downwardly.

2. The apparatus according to claim 1 wherein said second arm is connected to said parallelogram linkage on the opposite side of said first arm from the pivotal connection of said parallelogram linkage to said support means.

3. The apparatus according to claim 1 wherein each said blade has the shape of a segment of a sphere and wherein the blades supported from parallelogram linkages supported respectively by said first and second support means are adapted to meet substantially near a spherical diameter, said first and second pivot points being spaced between the spherical diameter and said third point.

4. The apparatus of claim 1 including blade covers secured to said first arms above the location of said first and second pivot points for downward movement with said first arms to positionally replace said blades as said blades rotate downwardly about said first and second pivot points so that said blades and said blade covers encompass a ball of earth around the roots of a plant with said blades in their downward position.

5. The apparatus according to claim 4 wherein said blades and said covers each have the shape of a segment of a sphere.

6. The apparatus according to claim 1 wherein each blade has the shape of a segment of a sphere and wherein the blades supported from parallelogram linkages connected respectively to said first and second support means are adapted to meet substantially near a spherical diameter, said first and second pivot points being spaced between the spherical diameter and said third point,
said apparatus further including blade covers secured to said first arms above the location of said first and second pivot points for downward movement with said first arm to positionally replace said blades as said blades rotate downwardly about said first and second pivot points so that said blades and said blade covers encompass a ball of earth around the roots of a plant with said blades in their downward position, wherein said blade covers extend together near said spherical diameter with said blades in their downward position, said blade covers having an area of separation upwardly from said spherical diameter for passage of the trunk of said plant.

7. The apparatus according to claim 6 further provided with shields mounted upon said support means and extending downwardly to the area of separation between said blade covers, said shields having foot portions each having a semiaperture for surrounding a trunk of a plant and bearing against the top of the ball of earth including a portion of the roots of said plant when said blades are in their downward position.

8. The apparatus according to claim 1 wherein each said blade has the shape of a segment of a sphere and has a reduced thickness towards a narrow forward cutting edge, said thickness tapering rearwardly to a greater thickness toward the rearward part of said blade.

9. The apparatus according to claim 1 wherein said control means comprises a hydraulic cylinder interposed between said support means and said parallelogram linkages.

10. The apparatus according to claim 1 wherein each said blade includes a rearward bracket located substantially midway between said first and second pivot points and a pivotal connection between said bracket and said second arm at said third point.

11. A nursery stocks digging machine comprising:

first and second pivotable support means for mounting on a vehicle, and means for causing movement of said support means toward and away from one another in a substantially horizontal direction, a separate linkage pivotally connected to each said support means and including a lever arm connected for rotation in a substantially vertical direction with respect to said support means, control means for pivoting each lever arm, a first arm pivotally attached to each lever arm at an intermediate location thereupon, a blade pivotally supported at the remote end of each first arm, said blade having the shape of a segment of a sphere and having a generally downwardly curved forward cutting edge between pivot points thereof, and a second arm pivotally attached to each lever arm on the opposite side of said first arm from said support means, said second arm pivotally engaging said blade at a different location thereon from said first arm, so that operation of said control means is effective to rotate said blade with respect to said first arm.

\* \* \* \* \*

UNITED STATES PATENT OFFICE
CERTIFICATE OF CORRECTION

PATENT NO. : 3,977,099
DATED : August 31, 1976
INVENTOR(S) : JOHN E. STEWART

It is certified that error appears in the above-identified patent and that said Letters Patent are hereby corrected as shown below:

Column 1, line 43, "formed" should be --forced--.

Column 2, line 8, "annd" should be --and--.

Column 2, line 9, "in" should be --to--.

Column 2, line 36, "stock" should be --stocks--.

Column 2, line 39, "backbone" should be --backhoe--.

Column 2, line 45, "into" should be --from--.

Column 3, line 21, "42" should be --62--.

Column 3, line 47, "edge" should be --shape--.

Column 3, line 62, "distance" should be --distances--.

Column 4, line 48, "68'" (third occurrence) should be --66'--.

Column 5, line 15, "moves" should be --move--.

Column 5, line 23, "section" should be --action--.

Column 7, line 6, "linkages" should be --linkage--.

Signed and Sealed this

Thirtieth Day of November 1976

[SEAL]

Attest:

RUTH C. MASON
*Attesting Officer*

C. MARSHALL DANN
*Commissioner of Patents and Trademarks*